July 8, 1969

J. MARX 3,453,884

CHANGE-OVER VALVE DEVICE

Filed Sept. 8, 1966

INVENTOR.
JOSEF MARX
BY
ATTORNEYS

United States Patent Office 3,453,884
Patented July 8, 1969

3,453,884
CHANGE-OVER VALVE DEVICE
Josef Marx, Mainz-Kastel, Germany, assignor to Elster & Co. Aktiengesellschaft, Mainz-Kastel, Germany
Filed Sept. 8, 1966, Ser. No. 578,001
Claims priority, application Germany, Sept. 22, 1965,
M 66,719
Int. Cl. G01f 1/00
U.S. Cl. 73—197                                   13 Claims

ABSTRACT OF THE DISCLOSURE

A change-over valve having a first low-flow outlet and a second high-flow outlet and a movable gate member, movable to close the second outlet and having an orifice therethrough to the first outlet, and a second gate member movable to close the orifice in said first gate member to increase the effective surface the gate member presents to incoming fluid.

Figure 1:
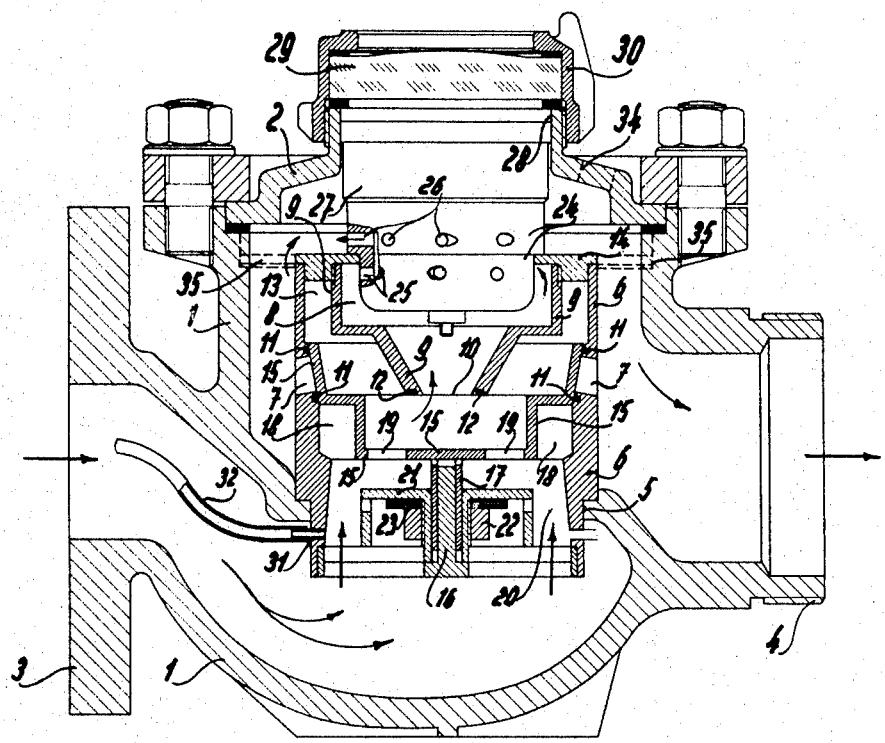

This invention relates in general to valves for controlling the flow of fluids, and more particularly to a change-over valve device whereby the flow of fluid therethrough is channelled to one or the other of two outlets in accordance with the flow rate.

The valve device of the invention is so constructed and arranged that at flow rates ranging from zero up to a predetermined change-over flow rate, the fluid flow occurs from the inlet to the first outlet of the valve, and for flow rates at and above this change-over flow rate, the fluid flow occurs from the inlet to the second outlet of the valve. Accordingly, to accommodate each alternative range of flow rates with a minimum of energy loss, the valve parts are shaped to provide a larger flow cross-section path to the high flow range outlet than is provided to the low flow range outlet.

The change-over, or switching of the fluid flow through the valve from the low to the high flow range outlet, is accomplished by a floating gate means disposed within the valve body for movement relative thereto in response to forces exerted by the fluid flow. This gate means normally rests in a position of sealing engagement with the high flow range outlet to channel fluid flow from the valve inlet to the low range outlet until the flow increases beyond the change-over rate, upon which occurrence, the gate means shifts from its position of sealing engagement with the high range outlet to a position of sealing engagement with the low range outlet, thereby opening up a greater flow cross-section area to carry the higher flows. Should the flow drop back into the low range, the gate means is, of course, automatically restored to its normal position to seal the high range outlet and open the low range outlet.

The gate means utilized by the invention can be regarded as a floating type, not merely because of its buoyancy characteristics, but more so because it is not fixedly connected to the valve body or to any element fixed in relation thereto.

According to a preferred embodiment of the invention, the gate means includes a primary gate member and an auxiliary gate member, both of the floating type. The covering and uncovering of the two valve body outlets is performed by the primary gate member, which is arranged to normally seal the high range outlet only, and upon occurrence of a high range flow condition, shifts to seal the low range outlet and open the high range outlet. The auxiliary gate member serves to increase the effective fluid force receiving area of the primary gate member whenever a high range flow condition occurs, and hence can be considered as a pilot element.

Although during low range flow conditions, the primary gate member is acted upon by fluid forces, such primary gate member is provided with one or more apertures to accommodate low range flows therethrough, and also to reduce the effective fluid force receiving area of the primary gate member to the extent that for all low range flows, said primary gate member is not shifted from its normal high range outlet sealing position upon occurrence of a high range flow condition, the auxiliary gate member is driven by fluid forces into a position of engaging contact with the primary gate member to seal the aperture or apertures thereof, thereby immediately increasing the effective area of the primary gate member to the extent that it is driven, together with the auxiliary gate member, by fluid forces into a position wherein the primary gate member seals the low range outlet and opens the high range outlet. Should the flow through the valve return to the low range, the auxiliary gate member separates from the primary gate member, thereby uncovering the apertures thereof to reduce the forces tending to hold the primary gate member in sealing engagement with the low range outlet, thus restoring the primary gate member to its normal, low range flow position.

This invention has particular applicability to valve change-over devices for compound meter systems for the volumetric measurement of fluid media flowing in conduits.

It is customary in compound meter systems to arrange primary and auxiliary meters in parallel. A weight-loaded flap valve as a rule serves as a change-over device, such valve being disposed in the primary meter conduit and controlling a valve for the auxiliary meter conduit by means of a control member located on the flap.

The customary compound meter systems of this type cannot attain the strict requirements of present-day measuring practice.

In these known arrangements it is disadvantageous that the primary meter must be equipped on both sides with connection points for the auxiliary meter conduit, having due regard to the circumstances of a particular location, and that the number of necessary sealing points due to this auxiliary meter conduit is undesirably large.

To these disadvantages there is also added the necessity of having to use correspondingly large mechanical counter-acting forces for loading the flap valve against the forces acting on it. As is well known, on reaching the rate of flow at which the change-over from the small cross-section of the auxiliary meter conduit to the larger cross-section of the primary meter conduit takes place, the pressure different $\Delta p$ prevailing at the flap valve is comparatively large, especially as the small meter has a high pressure loss. Moreover, since the cross-section F to be closed by the flap which really corresponds to the nominal width of the primary meter is likewise large, the product $\Delta p.F$ reaches values which demand constructions of large volume in order to provide the necessary loading force and corresponding casing dimensions.

In addition to the above-mentioned disadvantages of known flap valves, there is also the difficulty that is caused in obtaining an exact observation of the change-over point and in attaining a stroke-like rapid change-over from the small to the large cross-section with its attendant problems.

In order to try to overcome these difficulties and also in order to be able to record very small quantities of the medium to be measured as they pass through the primary meter at the beginning of opening movement of the flap, many different methods have been used. Thus, for example, in one arrangement the flap in the primary meter conduit is provided with a lug which, with the flap in the rest position, engages in the output mouth of the auxiliary meter conduit and gives to the output mouth a flow cross-section which decreases from the rest position of the flap up to complete freedom of the auxiliary meter conduit. The pressure drop thereby created at this lug acts additionally via a large lever arm on the flap and by means of the increased turning moment thus produced, the instantaneous opening of the flap is ensured.

Because of the compensation provided by the flow already previously beginning and the consequent decrease in the effective pressure difference on the opened flap, the desired result is only partially achieved. In addition to this, this type of arrangement still possesses the above-mentioned disadvantages.

The present invention provides a change-over device for compound meter systems which is free from all these disadvantages, which ensures an error-free, instantaneous change-over, and which is distinguished by its extremely small space requirements on account of the complete lack of bulky operating elements, and in which no complicated and expensive measures due to space restrictions in special locations are necessary.

The invention is based upon a known construction of a compound meter system in which the change-over device is disposed in a shell body which is open at the bottom and which is inserted into, and forms part of, the fluid flow path through a valve casing, said body being provided with outlets leading to both primary and auxiliary meter conduits. The invention is essentially characterized by a primary float arranged to be reciprocally movable in the space between two valve seats serving as the valve member of a change-over mechanism formed as a double-seat valve, by this valve member being provided with a step-form effective surface and a passage opening to an auxiliary meter, and by an auxiliary float being provided for movement independently of said primary float but coaxially therewith in an input chamber of the valve, said input chamber decreasing in cross-section in the direction of fluid flow, and said auxiliary float being arranged to close the passage opening in said primary float on abutment therewith, thereby increasing the effective surface area of the same.

The thus characterized construction according to the invention may be modified within the scope of the invention. Accordingly, one of the valve seats which is associated with the auxiliary meter, may be disposed centrally in the upper part of said shell body and mounted on a valve partition member which both defines an upper outlet chamber of the shell body and forms an input chamber casing for the auxiliary meter, a measuring mechanism insert with its lower part provided with fluid input openings being sealingly disposed in said upper outlet chamber, and the upper part of said measuring mechanism insert being connected through fluid output openings to the fluid outlet of the valve casing. Thus, a cover plate provided for the valve casing can additionally form an upper casing part with a reading window for the auxiliary meter and also a centering device for the measuring mechanism insert.

It is therefore an object of the invention to provide a change-over valve device which directs the flow of fluid therethrough to one or the other of two outlets in accordance with the fluid flow rate.

Another object of the invention is to provide a change-over valve device, as aforesaid, which is automatic in its operation to direct the flow of fluid through the valve to one outlet for flow rates up to a predetermined change-over rate, and to direct the flow of fluid to the other outlet for flow rates at and above such change-over rate.

A further object of the invention is to provide a change-over valve device, as aforesaid, which is adapted for use in conjunction with flow meters for volumetric measurement of fluid delivered at high flow rates and at low flow rates from respective valve outlets.

A further object of the invention is to provide a meter change-over valve device wherein the change-over of fluid flow from the low range outlet to the high range outlet, and vice versa, is accomplished substantially instantaneously by the action of fluid flow forces to minimize metering errors.

Still another and further object of the invention is to provide a meter change-over valve device, as aforesaid, which is reliable in operation and can be embodied within a relatively compact construction as compared with prior art meter change-over valves.

Figure 2:
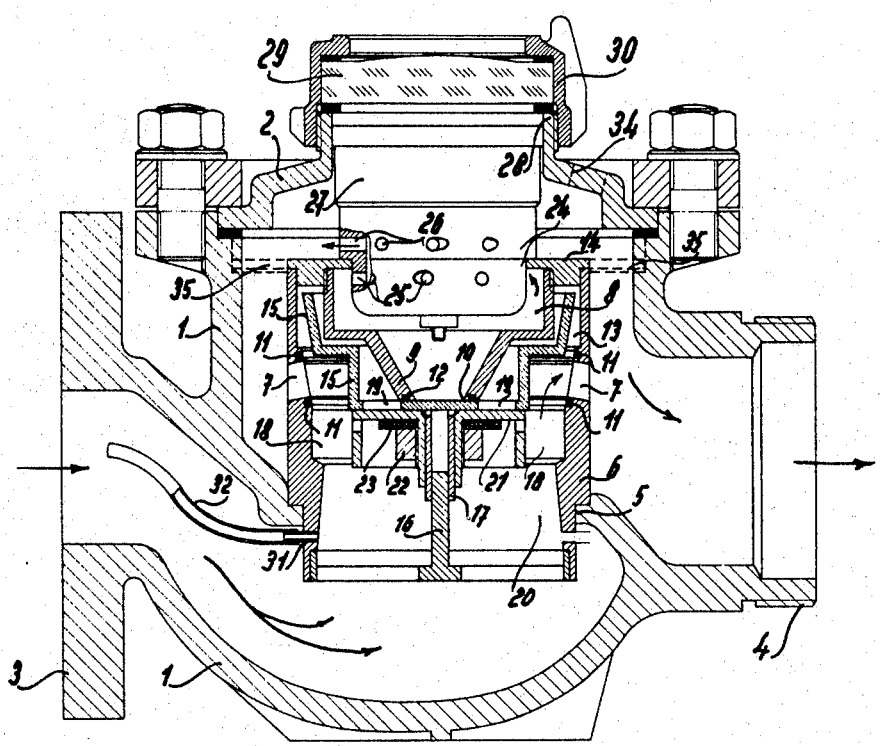

Other and further objects and advantages of the invention will become apparent from the following detailed description and accompanying drawings, in which:

FIG. 1 is an elevation view, partly in section, of a change-over valve device according to a preferred embodiment of the invention, which is adapted for use as a meter change-over valve and illustrating the position of the gate means thereof for flow conditions within the low flow rate range; and FIG. 2 is an elevation view, also partly in section, of the meter change-over valve shown in FIG. 1, illustrating the position of the gate means for flow conditions within the high flow rate range.

In FIGS. 1 and 2 reference numeral 1 indicates a housing for the valve change-over device. The housing 1 includes at the top a closure plate 2 and is arranged for connection, for example by a flange 3, to a primary meter (not shown), and by a coupling 4 to a consumer's conduit (likewise not shown).

The valve change-over mechanism itself is accommodated in a known manner in compound meter systems, in a tubular shell 6 which is open at the bottom and which is inserted into an input opening 5 in the housing 1. The tubular shell 6 is provided with two fluid outlets 7 and 8, one of which, outlet 7, i.e. the primary path, leads directly to the consumer conduit, and the other of which, outlet 8, leads to this conduit via an auxiliary meter conduit system or path. A double-seat valve incorporating a slide element serves as the valve change-over mechanism (likewise as is known in compound meter systems). The valve maintains the primary path closed in one terminal position of its slide element while simultaneously opening the path through the auxiliary meter, as exemplified by FIG. 1, and in the other terminal position of the slide element, opens the primary path and blocks the path through the auxiliary meter (as exemplified by FIG. 2).

Fluid outlet 7 is provided around the circumference of the tubular shell 6, in a manner normal for such inserts, in the form of one or more vent openings circumferentially arranged to define an annular vent 7 which forms part of the primary fluid path. Fluid outlet 8 on the other hand, with which is associated the auxiliary fluid path and meter, is located at the upper end of the tubular shell 6. The latter outlet is defined by a space formed within the confines of the shell 6 by a valve partition wall 9, which is mounted centrally within the shell 6 and which has a fluid inlet opening 10 provided centrally at the bottom thereof. A first valve seat 11 is located around the vent 7 and is mounted in the shell 6 above and below the vent opening, and a second valve seat 12 is mounted in the annular downward-facing surface defining the valve partition wall fluid inlet opening 10. The partition wall 9 and the shell 6, which are spaced from one another, define an annular chamber 13 therebetween, which is closed at the top by an annular disc 14 or equivalent closure means.

A float gate member 15 serves as the slide element of the double-seat valve, this float 15 being disposed within the shell 6 and being movable between the two valve seats 11 and 12. The float 15 is preferably provided with a tubular axial extension piece 17 at its lower end, which is slidably mounted on a fixed cylindrical guide 16. The float 15 includes a pot-shaped portion which is provided with a step or the like and which defines, by means of this step, an annular channel 18 between the float and the shell. In the base of the pot-shaped portion is provided an aperture 19 leading to the auxiliary meter and preferably formed as an annulus.

The open lower end of the shell 6 forms a fluid input chamber 20, and the internal walls of this part of the shell are shaped to provide a fluid flow cross-section which decreases in the upward direction, i.e. in the direction of flow of the medium to be measured. The float 15 is disposed in this chamber 20 to receive the direct force of the fluid flow, and the guide 16 and extension piece 17 maintain the float co-axial to the direction of flow. An auxiliary float gate member 21 is also arranged in the chamber 20 around the extension piece 17, and is movable up and down relative to the main float 15. This auxiliary float 21 is arranged to close the aperture 19 in the base of the main float upon a flat upper surface of the auxiliary float coming into engagement with the the base of the main float 15, this closure of the opening 19 by the auxiliary float increasing the effective surface of the main float 15 presented to the fluid flow.

As will be appreciated from the drawing, the fixed cylindrical guide 16 is disposed centrally of the shell 6 and has a lower end flange against which the auxiliary float 21 rests in its lower end position. Both the floats are mounted so as to be easily displaceable on the guide 16.

Loading members 23 (discs or the like) are secured so as to be easily removable on the auxiliary float 21 by means of a nut 22, and serve to vary the weight of the auxiliary float and consequently the change-over point at which the float moves up or down relative to the main float.

In the fluid outlet 8 at the top of the valve wall 9 a measuring and counting mechanism 24, forming part of the auxiliary meter, is inserted in a sealing manner so that the fluid outlet 8 forms or replaces a fluid input chamber casing for the auxiliary meter. The lower part of the mechanism 24 which projects into fluid outlet 8 is provided with input flow openings 25, while the upper part of the mechanism 24 has output flow openings 26 provided therein which enable fluid to pass into the output chamber of the casing 1.

The counting mechanism of the auxiliary meter is indicated at 27. It is provided at the top with a dial plate, and in the usual manner is disposed above the measuring mechanism. The upper portion of the insert projects into a central aperture 28 in the cover plate 2 of the casing 1, which is closed at the top by a screw cap 30 provided with a reading window 29.

This simple arrangement consequently forms a cover for the casing 1, as well as an upper casing part with reading window for the auxiliary meter, and also a centering device for the measuring mechanism and counting mechanism insert of the same. Moreover, since as stated, the upper fluid outlet 8 of the valve change-over device serves simultaneously as the fluid input space for the auxiliary meter, the necessity of providing an individual casing for the auxiliary meter does not arise.

In addition, it will be apparent that no weighted lever arrangement or other variable load device need be used for the floating slide element 15 of the double-seat valve, and it is clear from these considerations that in the change-over device according to the invention, the space requirements inclusive of the auxiliary meter arrangement are only a fraction of that required in known constructions even without the auxiliary meter arrangement.

A further advantage of decided importance is the attainment of a truly error-free, stroke-like, quick-acting change-over from one measuring range to another, as a consequence of which no drop in the error curve occurs on switching.

The manner of operation of the embodiment illustrated in the drawing will now be considered. In FIG. 1 the valve change-over device is shown in the working position in which it receives fluid from a motionless primary meter and passes it to the auxiliary meter. FIG. 2 shows the working position with the primary meter operative and the auxiliary meter path closed. The float 15 acting as the slide element of the double-seat valve will be referred to in the following description as the "primary float" for the sake of simplicity.

If a pressure difference arises from the beginning of withdrawal of fluid via the consumer's conduit between the input and output sides of the compound meter system, then the fluid medium to be measured flows with a corresponding flow rate Q through the primary meter and the input side of the casing 1 of the valve change-over device, as well as via the path indicated in FIG. 1 through the tubular shell insert 6 and the auxiliary meter to the output side of the casing 1.

Within the confines of the tubular shell insert 6, the fluid medium flows through the input chamber 20 within which is disposed the auxiliary float 21, through the aperture 19 in the base of the valve slide element 15 which is located in its lower end position, through the aperture 10 for the auxiliary meter in the valve wall 9, and finally through the fluid outlet 8.

With increased rate of flow, a pressure drop $\Delta p$ is created in the input chamber 20 of the tubular shell insert 6 at the auxiliary float 21, which, if the surface area of the auxiliary float is denoted by $f$, produces a force $P = \Delta p.f$. If this force becomes greater than the weight $G_1$ of the auxiliary float 21, then the float will be caused to move upwards. Moreover, since on account of the decreasing flow cross-section in the chamber 20, a rapid rise in the pressure difference accompanies this upward movement, the force $\Delta p.f$ increases so quickly that no wavering in the movement of the auxiliary float is possible.

Upon attaining a predetermined rate of flow Q, the auxiliary float 21 is forced automatically and rapidly upwards into engagement with the primary float 15 of the valve change-over mechanism and closes the aperture 19 in the base of the primary float, so that the primary float 15 now has an increased effective surface area F. At this instant (change-over point), during which no fluid flow can take place and the pressure difference at the primary float 15 and consequently the force $\Delta p.f$ effective on it rises instantaneously, the primary float 15 is suddenly pulled upward.

Of course, even at the beginning of this change-over movement, a small cross-section at the valve seat 11 is opened, so that the medium to be measured flows through the annular vent 7. However, the pressure difference between the annular channel 18 below the step of the primary float and the annular vent 7 issuing into the output chamber of the casing 1, remains so large that the upward force $\Delta p.F$ effective on the primary float 15 is constantly larger than the weight $G_2$ of the primary float, with the result that the float rises steadily from its lower to its upper end position, i.e. from valve seat 11 to the abutment of its base against valve seat 12.

In this upper end position of the primary float 15, the path to the auxiliary meter is blocked, and the medium to be measured thus passes through the annular vent 7 directly to the output chamber of the casing 1. Thereby, the upward force effective on the primary float 15 is sufficient to safely hold the opening 10 to the auxiliary meter closed. This force bocomes rapidly greater with increasing flow pressure, since the pressure difference between the annular channel 18 and the annular vent 7 increases quadratically with the flow pressure. The flow cross-sections at this point and around the auxiliary float 21 are so dimensioned that, with the maximum loading of the primary meter, the pressure drop at the primary float does not exceed a predetermined permissible level.

If the flow pressure decreases again, then the pressure difference at the auxiliary float 21 decreases until the point is reached at which the force $\Delta p.f$ effective on it is smaller than its weight $G_1$. When this occurs, the auxiliary float 21 separates from the primary float 15, which itself returns to the valve seat 11 on account of the now freed aperture 19 therein and blocks the outlet vent 7, with the result that the auxiliary meter is again connected into the fluid path. Consequently, the primary float (which, like the auxiliary float, may be made of a light material, preferably a synthetic plastics material) need only rest lightly on the valve seat 11, and a quite small pressure is sufficient to produce a force on it large enough to hold the vent 7 closed. This closing force also increases quadratically with the rate of flow Q since the pressure difference at the vent 7 varies quadratically with the rate Q and the closing force is equal to the product, $P = \Delta p.F. \sin \alpha$, produced by the product of this pressure difference and the perpendicular projection of the tapering sealing surface of the primary float in contact with the valve seat 11.

In the description of the embodiment shown in the drawings an arrangement known in compound meter systems has been taken as a starting point, in which the valve change-over device is connected into the flow path after the primary meter, and in which the medium to be measured, even when it passes through the auxiliary meter, also follows a path through the primary meter.

In such known arrangement it is usual to provide the primary meter with a brake by means of which it can be brought to a stop at the instant of change-over to the auxiliary meter, so that when the auxiliary meter is operative, there is no danger of obtaining a double count.

Such brake or retaining means and flow-dependent control means therefor, for example a differential pressure senor provided on the primary meter, do not form part of the present invention.

As a development of the invention, however, precautionary measures are taken by means of which the auxiliary float 21, in actual fact the change in the pressure difference created by it during its change-over movement, is made to serve as the actuating means of such a retaining device; e.g. of a differential pressure sensor or the like controlled by the pressure difference created at the float.

In the illustrated embodiment, a pressure transmitting tube 32 is provided for this purpose, connected for example at 31, to the input chamber 20 of the valve shell 6. This tube 32 is arranged to connect the flow cross-section at the auxiliary float 21 to a pressure difference sensor associated with the primary meter. Upon change-over, with the provided change in this flow cross-section, a considerable change in the pressure drop between the primary meter and said cross-section takes place, which results in a corresponding switch movement of the sensor and of the retaining member moved by it.

If the compound meter system is arranged in the following order: valve change-over device, primary meter, auxiliary meter, then the retaining or braking of the primary meter is unnecessary. In such a case, however, the outlet of the auxiliary meter insert (i.e. the openings 26 in the described example) must be closed off from the output chamber of the casing 1 by means of a partition, and the auxiliary meter flow must be returned through a conduit issuing after the primary meter into the primary fluid path.

The partitioning means 35 referred to is indicated by broken lines in the drawing. An outlet port 34 for connecting the required return conduit is shown disposed in the casing cover plate 2. Moreover, it will be seen that in this case an annular collar-type element 35 around the sealing ring 14 of the valve shell insert 6 serves as the partition by means of which the annular cross-section path leading to the casing output 4 is closed. Naturally, a closure ring independent of the annular sealing ring 14 can alternatively be provided as the partition.

If one disregards the small return conduit, then this arrangement possesses all the above-mentioned advantages of the invention, i.e. including the saving of a special auxiliary meter casing.

The invention can be used both for compound switching in liquid meters, as well as for compound switching in gas meters. This is a further advantage of the invention over the known and customary switching or change-over devices which are always only suitable either for liquid meters or for gas meters, and which in the second case require cumbersome membrane arrangements for moving the valve slide element.

As may be recognized from the illustrated measuring and counting mechanism insert of known construction, it has been assumed in the foregoing description that the embodiment is to be used as a compound water meter system. For its use as a compound gas meter system, the arrangement can remain essentially the same. In the latter case, however, the illustrated measuring and counting mechanism insert customary for water meters would be replaced by a corresponding or convenient gas meter insert.

Needless to say, in the realization of the invention, it is not absolutely necessary to couple in a constructional manner the auxiliary meter insert in the preferred manner within casing 1 of the device with the valve change-over mechanism, i.e., the invention also includes embodiments in which the measuring and counting mechanism insert forming part of the auxiliary meter is disposed in a housing or conduit connected externally to the casing 1 of the device, with means coupling it to the output of the primary fluid path.

This housing or conduit can simply consist of a tubular extension disposed in the upper fluid outlet 8 of the valve shell insert instead of the illustrated measuring and counting mechanism 24, 27, such tubular extension passing through the opening 28 in the casing cover plate 2 in sealing manner, and receiving a measuring insert in a portion thereof located externally of the casing 1. Such an arrangement is chiefly used in special cases in which only a bellows gas meter measuring mechanism insert is available for the measurement, the dimensions of such insert being too large for it to be placed inside the casing 1.

With regard to the state of the art, it should also be noted that in change-over devices for compound meters it is known to couple an auxiliary float to the slide element of the valve change-over device. In such known arrangements, however, this auxiliary float has a quite different function to fulfill. Thus, in such cases, it serves to operate a servo motor via a rod system and to control a membrane arrangement by this means.

As can be appreciated by the artisan from the foregoing, the invention is susceptible of numerous obvious modifications and variations. However, the invention is intended to be limited only by the following claims in which I have endeavored to claim all inherent novelty.

What is claimed is:

1. In a change-over valve device which comprises a valve body having a fluid inlet, a first fluid outlet, and a second fluid outlet, and gate means disposed within said valve body for movement relative thereto in response to forces exerted upon said gate means by fluid flowing through the valve body, said gate means being normally disposed to rest in a position of sealing engagement with said first fluid outlet to channel fluid flow through the valve body from the inlet to the second outlet thereof for fluid flows ranging from zero up to a predetermined change-over flow rate, said gate means being of a stepform, and being disposed for movement from said position of sealing engagement with the first outlet to a position of sealing engagement with the second outlet to channel fluid flow through the valve body from the inlet to the first outlet thereof for fluid flows at and above said change-over flow rate; said gate means includes a first gate member and a second gate member, both disposed for movement relative to the valve body and coaxial to each other under the influence of said fluid flow forces, said first gate member being normally disposed to rest in a position of sealing engagement with said first outlet to channel the fluid flow within the valve body to said second outlet, said second gate member being disposed for movement into a position of engaging contact with the first gate member to increase the effective fluid force receiving area thereof to an amount sufficient to move said first and second gate members together into a position wherein the first gate member is in sealing engagement with the second outlet and released from sealing engagement with the first outlet to channel the fluid flow within the valve body to said first outlet for fluid flows at and above said change-over flow rate; the improvement wherein said first gate member has an aperture disposed to accommodate the flow therethrough of fluid passing to the second outlet when said first gate member is in its normal position of sealing engagement with the first outlet, and wherein said second gate member has a surface portion disposed to cover said aperture and thereby increase the effective fluid force receiving area of the first gate member to move same under the influence of such fluid flow forces out of its normal position of sealing engagement with the first outlet and into a position of sealing engagement with the second outlet for fluid flows at and above said change-over flow rate.

2. The change-over valve device according to claim 1 wherein said first gate member is disposed to rest in its normal position of sealing engagement with the first outlet under the influence of its own weight, and said second gate member is also disposed to rest in a normal position out of fluid force area increasing contact with the first gate member under the influence of its own weight, for fluid flows up to said change-over flow rate.

3. The change-over valve device according to claim 1 including guide means disposed within said valve body for engagement with said first and second gate members to guide their movement relative to each other and relative to the valve body along a predetermined, normally vertical path.

4. The change-over valve device according to claim 3 wherein said valve body has an entrance portion communicating with the inlet thereof, and wherein said second gate member is disposed for movement along said path through said entrance portion toward its position of aperture covering engagement with the first gate member, said entrance portion being of decreasing flow cross-section area in the direction of said second gate member movement to increase the fluid forces acting upon said second gate member and thereby accelerate the movement of same toward the first gate member.

5. A change-over valve device for compound meter systems for the volumetric measurement of media flowing in conduits, which comprises a valve mechanism disposed in a shell body which is open at the bottom and which is inserted into the incoming fluid flow path through a valve casing, said body being provided with outlets to both primary and auxiliary meter conduits, in which a primary float arranged to be reciprocally movable in the space between first and second valve seats serves as the slide element of the valve mechanism formed as a double-seat valve, in which said primary float is provided with a step-form effective surface and an opening to an auxiliary meter, and in which an auxiliary float is provided for movement independently of said primary float but coaxially therewith in an input chamber of the valve, said chamber decreasing in cross-section in the direction of fluid flow, and said auxiliary float being arranged to close the opening in said primary float on abutment therewith, thereby increasing the effective surface area of the primary float.

6. A change-over valve device according to claim 5 wherein said first valve seat is associated with the auxiliary meter and disposed centrally in the upper part of said shell body and mounted on a valve partition member which both defines an upper outlet chamber of the shell body and forms an input chamber casing for the auxiliary meter, and in which a measuring mechanism insert with its lower part provided with fluid input openings is sealingly disposed in said upper outlet chamber, the upper part of said insert being provided with fluid output openings to the fluid outlet of the valve casing.

7. A change-over valve device according to claim 6, including a counting mechanism forming part of the auxiliary meter and seated on said measuring mechanism insert, said counting mechanism being provided with a dial plate, the upper part of said counting mechanism projecting through a central opening in a cover plate for the valve casing which is closed at the top by a cap provided with a reading window.

8. A change-over valve according to claim 6, wherein said shell body outlet to the primary meter conduit is formed as an annular peripheral vent therethrough, and in which said second valve seat is formed by the internal surface of the shell body in the region of said annular vent said internal surface being part-conical and being arranged to engage a correspondingly shaped part of the primary float arranged above the step-form portion thereof.

9. A change-over valve device according to claim 1, for use with a primary meter which is provided with a pneumatically or hydraulically controlled retaining device which is automatically effective on change-over; including a pressure-transmitting pipe connected to the input chamber of the valve, through which pipe changes in the pressure drop at the auxiliary float on change-over are transmitted to switch means on said retaining device.

10. A change-over valve device according to claim 1, including a bellows gas meter insert disposed in an extension of a tubular member which extends the shell body outlet to said auxiliary meter conduit and which passes in sealing manner through an opening in a valve casing cover plate, said extension being arranged externally of the valve casing and being provided with a return conduit to the valve casing outlet.

11. A change-over valve device according to claim 1 including a sealing member disposed between the output of the auxiliary meter measuring mechanism insert and the outlet chamber of the valve casing, and including a feed-back conduit provided at the output side of the primary meter which branches off from the fluid path before the sealing member.

12. A change-over valve device according to claim 1, including a common guide on which the primary float and the auxiliary float are movable.

13. A change-over valve device according to claim 12, wherein said common guide includes a peg located axially in the fluid input chamber of the shell body, a tubular extension piece of the primary float slidable on said peg, and wherein said extension piece serves as a guide for the auxiliary float displaceably mounted thereon.

References Cited

UNITED STATES PATENTS

| 146,745 | 1/1874 | Blanchard | 73—276 |
| 1,251,484 | 1/1918 | Heimbecker et al. | 73—197 |

FOREIGN PATENTS

| 7,392 | 4/1894 | Great Britain. |
| 121,141 | 6/1900 | Germany. |
| 148,755 | 2/1904 | Germany. |

JAMES J. GILL, *Primary Examiner.*

ROBERT S. SALZMAN, *Assistant Examiner.*

U.S. Cl. X.R.

137—625.28